(12) United States Patent
Pirmann et al.

(10) Patent No.: US 9,874,643 B2
(45) Date of Patent: Jan. 23, 2018

(54) STORAGE PHOSPHOR PLATE ASSEMBLY, X-RAY CASSETTE AND SYSTEM FOR READING OUT STORAGE PHOSPHOR PLATES

(71) Applicant: Agfa HealthCare NV, Mortsel (BE)

(72) Inventors: Anton Pirmann, Munich (DE); Stephan Mair, Augsburg (DE)

(73) Assignee: AGFA HEALTHCARE NV, Mortsel (BE)

( * ) Notice: Subject to any disclaimer, the term of this patent is extended or adjusted under 35 U.S.C. 154(b) by 0 days.

(21) Appl. No.: 15/125,233

(22) PCT Filed: Mar. 17, 2015

(86) PCT No.: PCT/EP2015/055552
§ 371 (c)(1),
(2) Date: Sep. 12, 2016

(87) PCT Pub. No.: WO2015/140164
PCT Pub. Date: Sep. 24, 2015

(65) Prior Publication Data
US 2017/0090043 A1    Mar. 30, 2017

(30) Foreign Application Priority Data
Mar. 18, 2014   (EP) ..................... 14160451

(51) Int. Cl.
*G01T 1/20*       (2006.01)
*G03B 42/02*     (2006.01)
(Continued)

(52) U.S. Cl.
CPC .......... *G01T 1/2012* (2013.01); *G01T 1/2014* (2013.01); *G02B 27/024* (2013.01);
(Continued)

(58) Field of Classification Search
CPC .... G03B 42/047; G01T 1/2014; G01T 1/2012
See application file for complete search history.

(56) References Cited

U.S. PATENT DOCUMENTS 3,631,243 A * 12/1971 Byler .................. G03B 42/047
250/485.1
4,973,134 A    11/1990 Finkenzeller et al.
(Continued)

FOREIGN PATENT DOCUMENTS

EP        0 099 054 B1    1/1987
EP        2 568 334 A1    3/2013

OTHER PUBLICATIONS

"Magnetism: Permanent Magnets and Magnet Systems", IBS Magnet (2008), p. 1-44 (hereinafter "Magnet"), available at: https://www.ibsmagnet.com/pdf/en/ibs_e.pdf.*
(Continued)

*Primary Examiner* — Kenneth J Malkowski
(74) *Attorney, Agent, or Firm* — Keating and Bennett, LLP

(57) ABSTRACT

A storage phosphor plate assembly includes at least one storage phosphor plate having a storage phosphor layer for storing X-ray information and a substrate layer on which the storage phosphor layer is provided. The substrate layer contains a permanent magnetic material, and a support plate contains a magnetic material, the at least one storage phosphor plate being held on the support plate due to magnetic forces. The invention further relates to an X ray cassette and a system for reading out storage phosphor plate. An easy and safe handling of storage phosphor plates of various sizes and/or forms, in particular during the read-out process in the read-out system, is achieved.

13 Claims, 3 Drawing Sheets

(51) Int. Cl.
*G03B 42/04* (2006.01)
*G02B 27/02* (2006.01)
*G03B 42/08* (2006.01)

(52) U.S. Cl.
CPC ......... *G03B 42/023* (2013.01); *G03B 42/047* (2013.01); *G03B 42/08* (2013.01)

(56) References Cited

U.S. PATENT DOCUMENTS

| | | |
|---|---|---|
| 5,394,456 A | 2/1995 | Livingston |
| 5,475,406 A * | 12/1995 | Takahashi ................ B41J 2/471 347/154 |
| 2006/0091336 A1 | 5/2006 | Muller et al. |
| 2007/0145312 A1 | 6/2007 | Muller et al. |
| 2014/0284505 A1 | 9/2014 | Von Stein et al. |

OTHER PUBLICATIONS

Official Communication issued in corresponding International Application PCT/EP2015/055552, dated Sep. 29, 2016.
Official Communication issued in International Patent Application No. PCT/EP2015/055552, dated Nov. 9, 2015.

* cited by examiner

STORAGE PHOSPHOR PLATE ASSEMBLY, X-RAY CASSETTE AND SYSTEM FOR READING OUT STORAGE PHOSPHOR PLATES

CROSS-REFERENCE TO RELATED APPLICATIONS

This application is a 371 National Stage Application of PCT/EP2015/055552, filed Mar. 17, 2015. This application claims the benefit of European Application No. 14160451.2, filed Mar. 18, 2014, which is incorporated by reference herein in its entirety.

BACKGROUND OF THE INVENTION

1. Field of the Invention

The present invention relates to storage phosphor plate assembly, an X-ray cassette and a system for reading out storage phosphor plates.

2. Description of the Related Art

One possibility of recording X-ray images is to store X-ray radiation passing through an object, for example a patient, as a latent image in a so-called storage phosphor layer. In order to read out the latent image the storage phosphor layer is irradiated with stimulation light and thereby stimulated to emit emission light. The emission light, the intensity of which corresponds to the image stored in the storage phosphor layer, is detected by an optical detector and converted into electrical signals. Furthermore, the electrical signals are processed as required and finally made available for analysis, in particular for medical and/or diagnostic purposes, by being displayed on an appropriate display device, such as e.g. a monitor or printer.

In many medical applications, a storage phosphor plate is located within an X-ray cassette which has to be inserted into a read-out apparatus for reading out the image information stored in the storage phosphor layer. X-ray cassettes and corresponding storage phosphor plates usually have standardized dimensions. For certain applications, however, in particular in the field of non-destructive testing (NDT) and/or in dental applications, it may be necessary to use storage phosphor plates the shape and/or dimensions of which deviate from the aforementioned standardized dimensions.

SUMMARY OF THE INVENTION

Preferred embodiments of the invention provide a storage phosphor plate assembly, an X-ray cassette and an according system for reading out storage phosphor plates allowing for an easy and safe handling of storage phosphor plates, in particular during the read-out process.

According to an aspect of the invention, a storage phosphor plate assembly comprises at least one storage phosphor plate comprising a storage phosphor layer for storing X-ray information and a substrate layer on which the storage phosphor layer is provided, the substrate layer containing a permanent magnetic material, and a support plate containing a magnetic material, the at least one storage phosphor plate being held on the support plate due to magnetic forces.

According to another aspect of the invention, an X-ray cassette comprises a housing in which a storage phosphor plate assembly according to the aforementioned aspect of the invention is accommodated.

According to yet another aspect of the invention, a system for reading out X-ray information stored in storage phosphor plates comprises a storage phosphor plate assembly according to the aforementioned aspect of the invention, a read-out device configured to irradiate the at least one storage phosphor plate being held on the support plate with stimulating light and to detect emission light which is stimulated in the at least one storage phosphor plate, and a transport device configured to transport the storage phosphor plate assembly relative to the read-out device.

Preferred embodiments of the invention are based on the approach to provide storage phosphor plates with permanent magnetic properties so as to allow for attaching storage phosphor plates of various size and/or shape to a magnetic, in particular ferromagnetic or ferrimagnetic, support plate by simply placing the storage phosphor layers onto the magnetic support plate without the need for additional holding devices, like holders, brackets, adhesives or adhesive tapes. In addition to gravitational forces, significantly higher magnetic forces between the support plate and the storage phosphor plate contribute to a normal force between respective bottom faces of the storage phosphor plates, on the one hand, and the top face of the support plate, on the other hand, whereby a reliable frictional connection between the storage phosphor plates and the support plate is obtained.

Providing the storage phosphor plates with permanent magnetic properties yields the additional advantage that the support plate merely has to be magnetic, but does not have to be permanent magnetic, in order to obtain sufficient magnetic attraction between storage phosphor plates and the support plate. Advantageously, the support plate can be made of any magnetic, in particular ferromagnetic and/or ferrimagnetic material, like ferrite steel, without being limited to particular materials, like magnetically hard materials, and without the need of magnetizing same in the manufacturing process, which is a sophisticated task when a certain degree of homogeneity of magnetization shall be achieved. Last but not least, providing a magnetic, though not permanent magnetic, support plate allows for a transport of the support plate in the read-out system by permanent magnetic and/or electromagnetic transport devices or elements, whereby magnetic coupling and decoupling between the transport devices or elements, on the one hand, and the support plate, on the other hand, can be accomplished significantly easier than in cases where a permanent magnetic support plate is used.

In summary, the invention allows for an easy and safe handling of storage phosphor plates, in particular during the read-out process.

According to another preferred embodiment of the invention, the permanent magnetic material of the substrate layer corresponds to a ferromagnetic material exhibiting high coercive field strength, also referred to as coercivity (bHc, iHc), and/or high remanence, also referred to as residual magnetic flux density (Br). Preferably, the residual magnetic flux density Br is higher than 100 mT, in particular higher than 200 mT. It is also preferred that the coercivity bHc is higher than 70 kA/m, in particular higher than 140 kA/m, and/or the coercivity iHc is higher than 100 kA/m, in particular higher than 200 kA/m. Alternatively or additionally, the ferromagnetic material may exhibit a maximum energy product ((BH)max) which is higher than 5 kJ/m$^3$, in particular higher than 8 kJ/m$^3$. By using such a magnetically hard material, sufficiently high magnetic forces between the storage phosphor plates and the support plate are reliably achieved ensuring a particularly safe handling of the storage phosphor plates.

Preferably, the substrate layer has a thickness of between 0.5 and 2 mm, in particular of approximately 1 mm. Alternatively or additionally, the substrate layer may be a mechanically flexible layer. By at least one of the aforementioned embodiments, on the one hand, a sufficiently high mechanical stability is achieved so that the risk of damaging the storage phosphor layer can be reduced and, on the other hand, the storage phosphor plates exhibit a sufficiently high mechanical flexibility so as to be easily, in particular by hand, detached from the support plate.

According to another preferred embodiment, the magnetic material of the support plate, on which the storage phosphor plates can be attached, corresponds to a ferromagnetic and/or ferrimagnetic material. It is, moreover, preferred that the support plate is a rigid plate. For example, the support plate may contain a layer of steel or may be a steel plate, in particular of ferrite steel and/or of spring steel. Preferably, the ferrite steel or spring steel, respectively, exhibits an ultimate tensile stress of between 900 and 1600 $N/mm^2$, in particular of between 1100 and 1300 $N/mm^2$. It may further be preferred that the support plate has a thickness of between 200 µm and 400 µm, in particular of approximately 300 µm. By at least one of the aforementioned embodiments, safe handling of the storage phosphor plates, which are reliably held by the support plate, is further improved.

According to a further preferred embodiment, the transport device comprises at least one magnetic, preferably permanent magnetic or electromagnetic, element configured to couple to the support plate by magnetic forces. According to yet another preferred embodiment, the transport device comprises at least one roller configured to rotate about a rotational axis of the at least one roller, wherein the permanent magnetic or electromagnetic element is provided on the at least one roller and/or inside of the roller. By this, a robust and reliable handling, in particular transport, of the support plate together with the storage phosphor plates attached thereon is achieved, in particular during the read-out process where the support plate is transported relative to the read-out device.

A storage phosphor plate assembly according to an alternative aspect of the invention comprises at least one storage phosphor plate configured to store X-ray information and a support plate configured to hold the at least one storage phosphor plate, wherein the support plate is preferably configured so as to be manually loaded and/or unloaded with storage phosphor plates. According to this alternative aspect of the invention, the storage phosphor plates may be, but are not necessarily, fixed to the support plate with the aid of magnetic forces as elucidated in detail above. Alternatively or additionally, the storage phosphor plates may be held by the support plate by a holding device, for example holders, brackets, adhesives or adhesive tapes.

According to a further embodiment of the invention or of the aforementioned alternative aspect of the invention, the storage phosphor plate assembly comprises at least one marking element, the at least one marking element being provided on the, preferably magnetic, support plate and/or on the, preferably permanent magnetic, storage phosphor plate and being configured to identify the storage phosphor plate and/or the X-ray information stored in the storage phosphor plate and/or to add additional information to the storage phosphor plate and/or to the X-ray information stored in the storage phosphor plate. By this, additional information, in particular identification information, can be easily added to the storage phosphor plates in order to reduce the risk of confusion of the various storage phosphor plates placed on the support plate, so that correct assignment of a read out X-ray image to the according case, e.g. a tooth, patient, work piece etc., is ensured with high reliability.

According to another preferred embodiment, the at least one marking element contains a permanent magnetic material so as to be held on the, preferably magnetic, support plate due to magnetic forces. Regarding embodiments and advantages of magnetically fixing the marking elements to the support plate, the above elucidations regarding permanent magnetic storage phosphor plates apply accordingly.

According to yet another preferred embodiment of the storage phosphor plate assembly, the storage phosphor layer is configured to emit emission light upon irradiation with stimulating light and the at least one marking element comprises a fluorescent material being configured to emit fluorescent light upon irradiation with the stimulating light. In a preferred embodiment of the according system, the read-out device is configured to irradiate the at least one marking element, which is provided on the support plate and/or on the storage phosphor plate, with stimulating light and to detect fluorescent light emitted by the marking element upon irradiation with the stimulating light. By this, both the fluorescent light emitted by the marking elements and the emission light of the storage phosphor plates can be stimulated and detected by only one read-out device of the system. As a result, the obtained digital X-ray images not only contain the read out X-ray information but also information contained in the fluorescent marking elements, whereby correct identification of particular storage phosphor plates and/or assignment of read out X-ray information to a particular case is considerably facilitated.

The above and other elements, features, characteristics and advantages of the present invention will become more apparent from the following detailed description of preferred embodiments with reference to the attached figures.

DETAILED DESCRIPTION OF THE PREFERRED EMBODIMENTS

Figure 1:
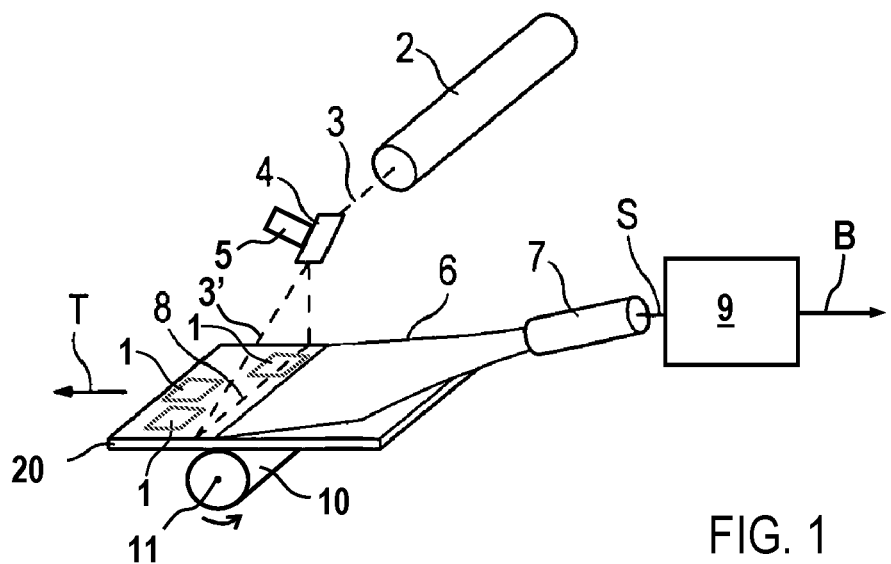
FIG. 1 is a schematic representation of an example of a system for reading out X-ray information stored in storage phosphor plates.

FIG. 1 shows schematic representation of an example of a system for reading out storage phosphor plates 1 provided on a support plate 20. The support plate 20 comprises a, preferably rigid, base plate containing magnetic material, in particular ferromagnetic and/or ferrimagnetic material. The storage phosphor plates 1 contain permanent magnetic material causing magnetic attraction between the storage phosphor plates 1 and support plate 20. As a result, the storage phosphor plates 1 are detachably fixed on the support plate 20. By this, the storages phosphor plates 1 are reliably fixed on the support plate 20 during handling, in particular during reading out X-ray information stored in the storage phosphor layers 1, but can be easily, in particular manually, detached from the support plate 20 after termination of the handling procedure.

A transport device is provided for conveying the support plate 20 together with the storage phosphor plates 1 provided thereon along a transport direction T. In the example shown, the transport device comprises a roller 10 which rotated about a rotational axis 11 by a roller drive (not shown). The support plate 20 is supported by the roller 10 and, as a result of frictional engagement between the support plate 20 and the roller 10, conveyed in direction T by a rotation of the roller 10.

The roller 10 contains magnetic, preferably permanently magnetic or electromagnetic, elements causing the roller to interact with the magnetic, in particular ferromagnetic and/or ferromagnetic, support plate 20 so that the support plate 20 is attracted by the roller 10. By this, the frictional forces between the bottom face of the support plate 20 and the roller 10 are significantly enlarged so that a particularly reliable transport of the support plate 20 and the storage phosphor plates 1 provided thereon is ensured.

Preferably, on the roller 10 at least one magnetic area is provided following a helical course. This embodiment is based on the approach of transporting the support plate 20 by a, preferably single, roller 10 having a magnetic area, whereby the magnetic area provided on the roller 10 follows a helical course. Preferably, the term "helical course" is understood to be a course of the magnetic area in the form of a helical line, helix, coil or a so-called cylindrical spiral about the rotational axis 11 of the roller 10, the distance from the magnetic area to the rotational axis 11 being preferably constant, i.e. the helical course being circular in cross-section. Preferably, the term "magnetic area" is understood to be a permanent magnetic area which attracts ferromagnetic and/or ferrimagnetic objects by magnetic forces. The helically configured course of the magnetic area offers the advantage, compared to completely sheathing the roller 10 with a magnetic layer, which however may also be a preferred embodiment, that during a complete rotation of the roller 10 no abutting edges or overlapping, respectively, of the leading and trailing edge of the sheathing occur, thus ensuring a highly reliable, shock-free transport of the support plate 20. The absence of abutting edges or overlapping edges moreover allows preventing jumps in the magnetic field lines generated by the magnetic area during the rotation of the roller 10, which additionally contributes to a shock-free transport of the support plate 20.

Alternatively or additionally, one or more magnetic, preferably permanent magnetic, elements are arranged inside the roller 10 which has the form of a hollow body, in particular a hollow cylinder. This embodiment is based on the approach of providing a hollow roller 10 for transporting the support plate 20, whereby one or more magnets are arranged inside the hollow roller 10 in such a way that during a rotation of the roller 10 they maintain a predetermined spatial position and in particular do not follow the rotational movement of the roller 10. The hollow roller body itself is hereby not magnetic, in particular not ferromagnetic. A support plate 20 being magnetic, in particular ferromagnetic and/or ferrimagnetic, at least in partial areas is attracted towards the hollow roller body by magnetic forces by the magnets arranged inside the hollow roller body in such a way that the frictional forces which occur when the support plate 20 comes into contact with the hollow roller body are considerably increased compared to a roller with no additional magnets arranged in its inside. During a rotation of the roller 10 the transport of the support plate 20 contacting the roller 10 is assured with increased reliability.

Overall, the above elucidated embodiments provide the advantage of combining a straightforward structure and a reliable transport of the support plate 10.

A laser 2 generates a stimulating light beam 3 that is deflected by a deflection element 4 in such a way that the deflected stimulating light 3' beam moves along a line 8 across the support plate 20. Preferably, the deflection element 4 comprises an oscillating mirror which is driven by drive unit 5. Alternatively, the deflection element 4 may comprise a rotating polygon mirror driven by the drive unit, e.g. a motor.

Due to a simultaneous transport of the support plate 20 in the transport direction T, the line 8 of the deflected stimulation light beam 3' successively crosses different linear areas of the support plate 20 including storage phosphor plates 1 provided thereon. During the movement of the deflected stimulating light beam 3' across a storage phosphor plate 1, the storage phosphor plate 1 emits emission light depending on the X-ray information stored therein, which emission light is collected by an optical collection device 6, for example an optical fiber bundle, and detected by an optical detector 7, preferably a photomultiplier (PMT), and is thereby converted into a corresponding detector signal S. The detector signal S is transmitted to a processing device 9, in which digital image signal values B for individual pixels of the read out X-ray image are derived. As a result, a two-dimensional X-ray image is obtained that is composed of individual pixels each associated with an image signal value B.

Figure 2:
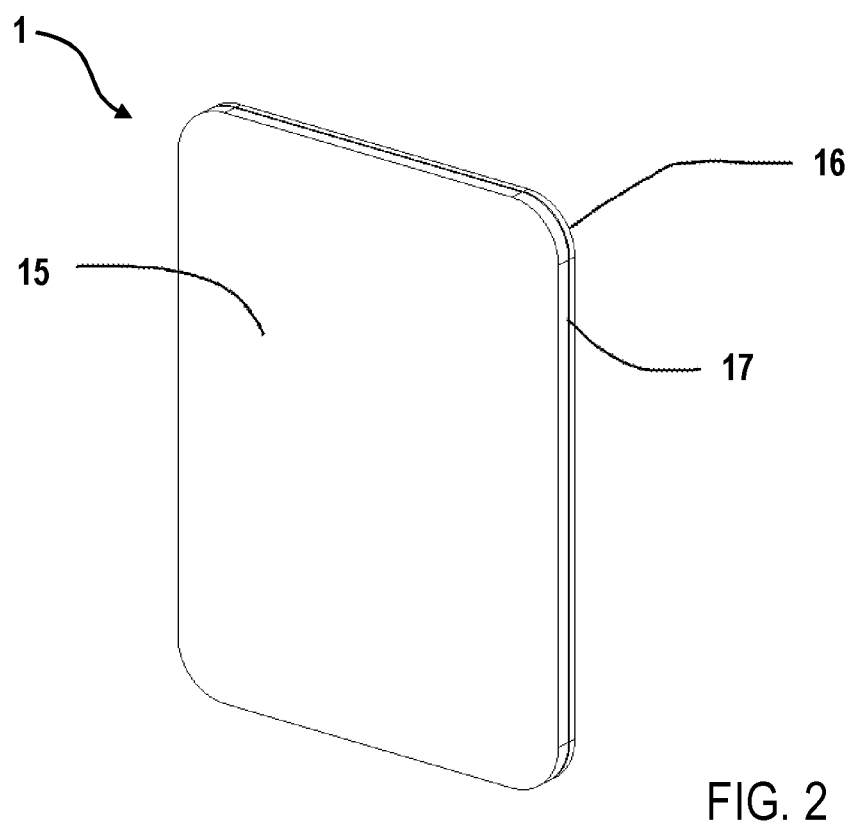
FIG. 2 is a perspective view of an example of a storage phosphor plate.

FIG. 2 shows a prospective view of an example of a storage phosphor plate 1 comprising a storage phosphor layer 15 which is applied to a substrate layer 16, e.g. by an adhesive layer 17.

Preferably, the substrate layer 16 is made of or contains a permanent magnetic material, e.g. a material containing iron, nickel or cobalt. In particular, the substrate layer 16 contains a magnetically hard material, e.g. tempered steel and/or ferrite steel, exhibiting a high residual magnetic flux density, also referred to as remanence, and/or high coercivity, also referred to as coercive field strength. Preferably, the residual magnetic flux density of the magnetic material is higher than 150 mT, in particular higher than 200 mT. It is further preferred that the coercivity is higher than 100 kA/m, preferably higher than 150 kA/m.

According to another preferred embodiment, the thickness of the substrate layers 16 is between 05 and 2 mm, in particular approximately 1 mm. It is, moreover, preferred, that the substrate layer 16 is a flexible layer.

The storage phosphor plates 1 of the storage phosphor plate assembly may have a variety of different forms and/or dimensions. E.g., in the field of dental X-ray imaging, storage phosphor plates 1 typically have an essentially rectangular form with dimensions in the range between 2 and 10 cm. In contrast to this, in the field of non-destructive testing, the storage phosphor plates 1 may be tailored in accordance with the particular object to be X-rayed. With the storage phosphor plate assembly according to the invention, storage phosphor plates 1 of different sizes and/or shapes, one the one hand, are reliably held on the support plate 20 (see FIG. 1) due to magnetic forces between the storage phosphor plates 1 and the support plate 20 and, one the other hand, can be easily, preferably by hand, detached or removed from the support plate 20.

Figure 3:
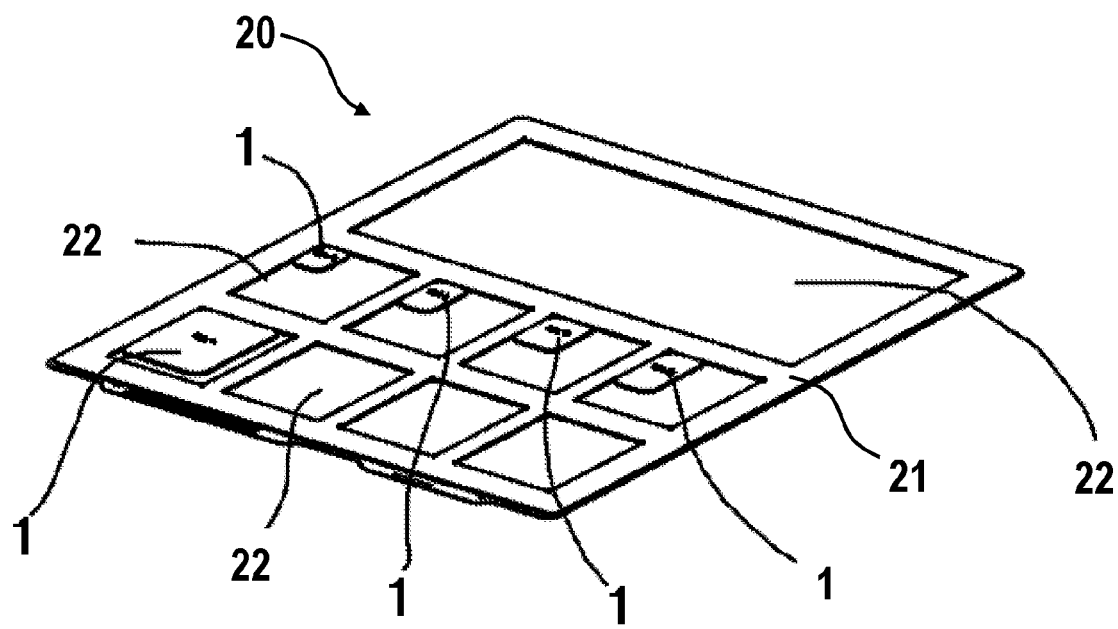
FIG. 3 is a first perspective view of an example of a storage phosphor plate assembly.
Figure 4:
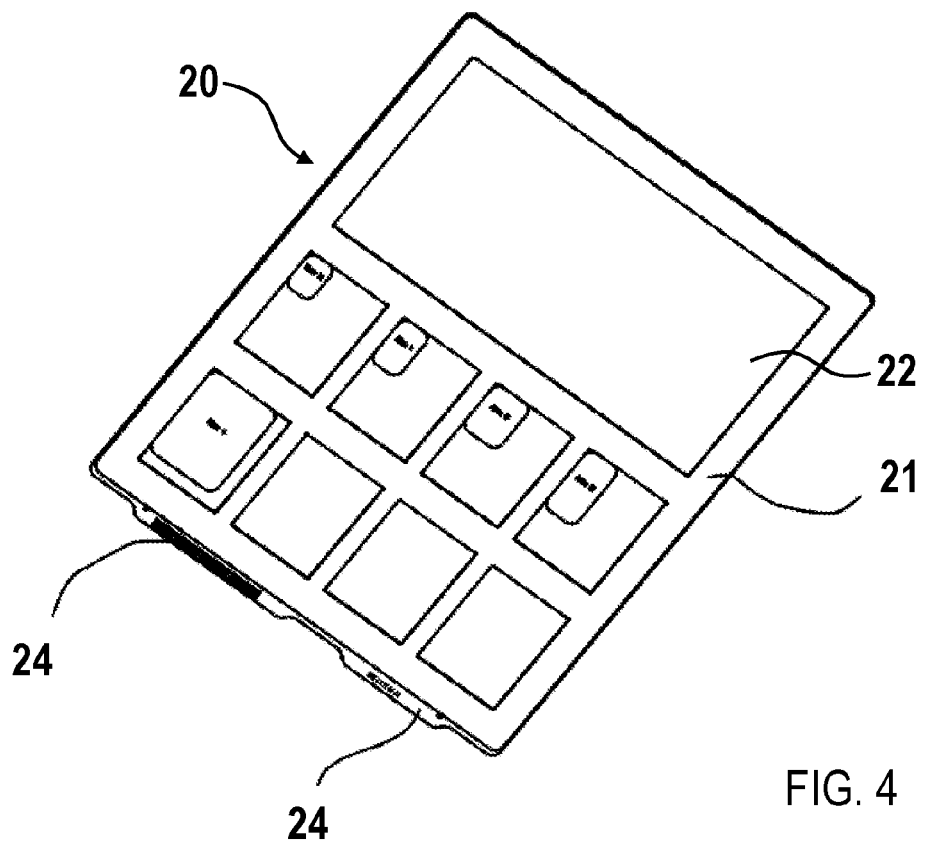
FIG. 4 is a second perspective view of an example of a storage phosphor plate assembly.

As already described above, the support plate 20 may be a rigid single plate made of a ferromagnetic and/or ferrimagnetic material, e.g. ferrite steel, but it may also have a more complex structure as will be apparent from further embodiments shown in FIGS. 3 and 4.

FIG. 3 shows a first perspective view of an example of a storage phosphor plate assembly, wherein the support plate 20 comprises a, preferably rigid, base plate 22 of a magnetic, in particular ferromagnetic and/or ferrimagnetic, material. On the upper side of the base plate 22 a frame 21 is provided, which subdivides the support plate 20 into different partitions, which can be loaded by a number of storage phosphor plates 1 of different size and/or shape, as exemplarily shown by a total of five different storage phosphor plates 1.

Preferably, frame 21 is manufactured separately from base plate 22 and is attached thereto, e.g. by laminating and/or gluing. Preferably, the frame 21 is made of plastics or metal.

FIG. 4 shows a second prospective view of an example of a storage phosphor plate assembly. As apparent from this representation, at one edge of the base plate 22 protrusions 24 are provided. Preferably, at least one of the protrusions 24 is provided with information, e.g. a machine-readable bar code or a clear text, enabling an identification of the support plate 20 and/or relating to the dimensions and/or structure of the support plate 20. Besides, the above elucidations in connection with the embodiment shown in FIG. 3 apply accordingly.

Figure 5:
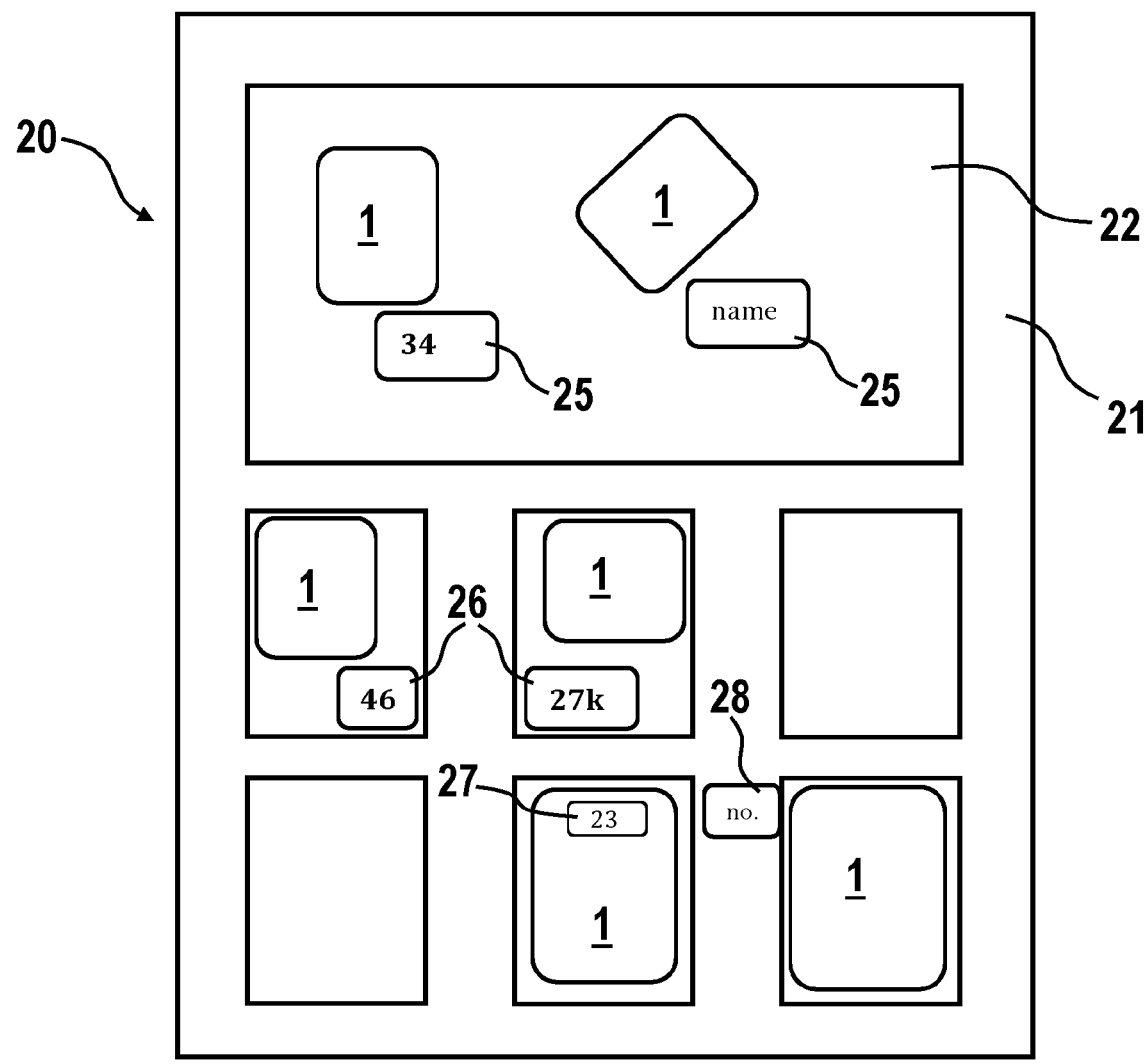
FIG. 5 is a front view of an example of a storage phosphor plate assembly.

FIG. 5 shows a front view of a further example of a storage phosphor plate assembly. Similarly to the embodiments shown in FIGS. 3 and 4, the magnetic base plate 22 of the support plate 20 is subdivided into several partitions which can be loaded with various storage phosphor plates 1.

In addition to the storage phosphor plates 1 marking elements 25 to 28 may be provided on support plate 20 for the purpose of adding information to, preferably each of, the storage phosphor plates 1.

For example, the marking elements 25 to 28 may contain information by which a particular storage phosphor plate 1 or an X-ray image stored therein can be identified. E.g., information contained in the marking elements 25 to 27 may relate to a particular tooth "34", "46", "27k" or "23" an X-ray image of which is stored in the respective storage phosphor plate 1. Alternatively or additionally, the information contained in the marking elements 25 and 28 may relate to any other information to be added to the respective storage phosphor plate 1, e.g. the "name" of a patient of a consecutive number "no." of an X-ray.

Preferably, the marking elements 25 and 26 are configured so as to be attracted to the magnetic base plate 22 of the support plate 20 by magnetic forces. To this purpose, the marking elements 25 and 26 comprise a top layer containing the information to be added and a bottom layer containing permanent magnetic material. Regarding the permanent magnetic bottom layer of the marking elements 25 and 26, the above elucidations with respect to substrate layer 16 of storage phosphor plate 1 shown in FIG. 2 apply accordingly. As a result, marking elements 25 and 26 can be placed easily and reliably in proximity to the storage phosphor plate 1 to which respective information is to be added. Likewise, after the readout of the X-ray information stored in the storage phosphor plates 1, the marking elements 25 and 26 can be detached or removed easily, preferably by hand, from the base plate 22 of the support plate 20.

According to another embodiment, marking elements 27 and 28 can be configured to be stuck or glued onto the storage phosphor plate 1 (see marking element 27) or onto an appropriate section of frame 21 (see marking element 28) in proximity to the phosphor plate 1 to which respective information is to be added. Preferably, the marking elements 27 and 28 comprise a top layer containing the information to be added and an adhesive bottom layer by which the top layer is affixed to the storage phosphor plate 1 or the respective section of frame 21, respectively. Preferably, the adhesive layer contains an adhesive allowing for an easy and residue-free detachment of the marking element 27 from the storage phosphor plate 1 or of the marking element 28 from frame 21, respectively.

According to another preferred embodiment, the information contained in the marking elements 25 to 28 is represented or embodied by a fluorescent clear text and/or a fluorescent machine-readable code provided on the top layer of the marking elements 25 to 28. For example, the information "34" or "name" can be applied to marking element 25 by printing and/or handwriting using a fluorescent ink.

Preferably, the fluorescent clear text or code is configured to be stimulable by the deflected laser beam 3' (see FIG. 1) during the read-out process of the storage phosphor plates 1, whereby fluorescent light is emitted by the marking elements 25 to 28 and detected by detector 7. As a result, the finally obtained digital image of the storage phosphor assembly does not only contain the read out X-ray information stored in the storage phosphor plates 1, but also the additional information contained in the marking elements 25 to 28. In this way, a correct assignment of a read out X-ray image to the according case, e.g. a tooth, patient, work piece etc., is ensured with high reliability and is considerably simplified.

In another preferred embodiment, the fluorescent code or clear text provided on the top layer of the marking elements 25 to 28 is not only machine-readable by the storage phosphor read-out device, but also human-readable. By this, it can be easily ensured that the correct marking element 25 to 28 is chosen and placed in proximity to the according storage phosphor plate 1.

The invention claimed is:

1. A storage phosphor plate assembly comprising:
   at least one storage phosphor plate including a storage phosphor layer that emits emission light upon irradiation with stimulating light and stores X-ray information, and a substrate layer including a permanent magnetic material on which the storage phosphor layer is provided;
   a support plate including a magnetic material; and
   at least one marking element provided on the support plate and including a fluorescent material that emits fluorescent light upon irradiation with the stimulating light; wherein
   the at least one storage phosphor plate is held on the support plate by magnetic forces.

2. The storage phosphor plate assembly according to claim 1, wherein the permanent magnetic material in the substrate layer is a ferromagnetic material exhibiting a coercive field strength higher than 70 kA/m and/or a remanence higher than 100 mT.

3. The storage phosphor plate assembly according to claim 1, wherein the substrate layer is a flexible layer.

4. The storage phosphor plate assembly according to claim 1, wherein the magnetic material in the support plate is a ferromagnetic material and/or a ferrimagnetic material.

5. The storage phosphor plate assembly according to claim 1, wherein the support plate includes a layer of steel.

6. The storage phosphor plate assembly according to claim 1, wherein the support plate is a rigid plate.

7. The storage phosphor plate assembly according to claim 1, wherein the support plate has a thickness between 200 μm and 400 μm.

8. The storage phosphor plate assembly according to claim 1, wherein the at least one marking element identifies the storage phosphor plate and/or X-ray information stored in the storage phosphor plate.

9. The storage phosphor plate assembly according to claim 8, wherein the at least one marking element includes a permanent magnetic material and is held on the support plate by magnetic forces.

10. An X-ray cassette comprising:
a housing in which the storage phosphor plate assembly according to claim 1 is accommodated.

11. A system for reading out X-ray information stored in a storage phosphor plate, the system comprising:
the storage phosphor plate assembly according to claim 1;
a read-out device that irradiates the at least one storage phosphor plate with the stimulating light and that detects the emission light which is stimulated in the at least one storage phosphor plate; and
a transport device that transports the storage phosphor plate assembly relative to the read-out device; wherein
the read-out device further irradiates the at least one marking element with the stimulating light and detects the fluorescent light emitted by the at least one marking element upon irradiation with the stimulating light.

12. The system according to claim 11, wherein the transport device includes at least one magnetic element coupled to the support plate by magnetic forces.

13. The system according to claim 12, wherein the transport device includes at least one roller that rotates about a rotational axis of the at least one roller; and
the magnetic element is provided on the at least one roller and/or inside of the at least one roller.

* * * * *